United States Patent
Spangenberg (10) Patent No.: US 10,183,666 B2
(45) Date of Patent: Jan. 22, 2019

(54) METHOD AND DEVICE FOR DETERMINING A VALID LANE MARKING

(71) Applicant: Robert Spangenberg, Berlin (DE)

(72) Inventor: Robert Spangenberg, Berlin (DE)

(73) Assignee: HELLA KGAA HUECK & CO., Lippstadt (DE)

( * ) Notice: Subject to any disclaimer, the term of this patent is extended or adjusted under 35 U.S.C. 154(b) by 0 days.

(21) Appl. No.: 15/454,079

(22) Filed: Mar. 9, 2017

(65) Prior Publication Data

US 2018/0257641 A1 Sep. 13, 2018

Related U.S. Application Data

(62) Division of application No. 13/146,569, filed as application No. PCT/EP2010/051353 on Feb. 4, 2010, now Pat. No. 9,626,571.

(30) Foreign Application Priority Data

Feb. 4, 2009 (DE) ........................ 10 2009 007 342

(51) Int. Cl.
*B60W 30/08* (2012.01)
*G06K 9/00* (2006.01)

(52) U.S. Cl.
CPC ......... *B60W 30/08* (2013.01); *G06K 9/00798* (2013.01); *B60W 2420/42* (2013.01)

(58) Field of Classification Search
CPC .............. G06K 9/00798; B60W 30/08; B60W 2420/42

(Continued)

(56) References Cited

U.S. PATENT DOCUMENTS

| 6,456,730 B1 * | 9/2002 | Taniguchi ............ G06K 9/3241 382/103 |
| 7,113,867 B1 * | 9/2006 | Stein ........................ G06T 7/20 701/301 |

(Continued)

FOREIGN PATENT DOCUMENTS

| DE | 4133882 A1 | 4/1992 |
| DE | 19720764 A1 | 11/1997 |

(Continued)

OTHER PUBLICATIONS

Vlacic Ljubo et al., Intelligent Vehicles Technologies: Theory and Applications, SAE International, pp. 134-141, Butterworth-Heinemann, Oxford, Warrendale, PA.

(Continued)

*Primary Examiner* — Tyler J Lee
(74) *Attorney, Agent, or Firm* — Reising Ethington P.C.

(57) ABSTRACT

The invention relates to a method and a device for determining a valid lane marking (38 to 42; 56, 58) with the aid of a camera system (16) of a vehicle (12), in particular a road vehicle. With the aid of a camera (17) of the camera system (16) several pictures with an image of an area in front of the vehicle (12) are taken successively as a picture series and image data corresponding to the respective picture (30, 54, 66) are generated. The image data of at least a part of the pictures (30, 54, 66) of the picture series are processed, at least a first lane marking (38 to 42) and a second lane marking (56, 58) different from the first lane marking (38 to 42) being detected in at least one picture (30) of the picture series. A vehicle (34) driving ahead of the vehicle (12) is detected in at least two successively taken pictures (30, 54) and its position (P1 to P4) relative to the first lane marking (36 to 42) as well as its position (P1 to P4) relative to the second lane marking (56, 58) is determined. Dependent on the positions (P1 to P4) of the vehicle driving ahead (34)

(Continued)

determined with the aid of the pictures (30, 54), one of the detected lane markings (36 to 42, 56, 58) is selected as the valid lane marking (56, 58).

12 Claims, 5 Drawing Sheets

(58) Field of Classification Search
USPC .......................................................... 701/117
See application file for complete search history.

(56) References Cited

U.S. PATENT DOCUMENTS

| | | | | |
|---|---|---|---|---|
| 7,209,832 | B2* | 4/2007 | Yamamoto | G01S 17/936 |
| | | | | 382/103 |
| 7,295,683 | B2* | 11/2007 | Yamamoto | G06K 9/00798 |
| | | | | 340/438 |
| 9,251,708 | B2* | 2/2016 | Rosenbaum | G06K 9/00805 |
| 2003/0021445 | A1* | 1/2003 | Larice | G01S 5/163 |
| | | | | 382/104 |
| 2007/0198146 | A1* | 8/2007 | Ikeda | G06K 9/00798 |
| | | | | 701/23 |
| 2007/0225913 | A1* | 9/2007 | Ikeda | G06K 9/00798 |
| | | | | 382/104 |
| 2007/0253622 | A1* | 11/2007 | Ikeda | G06K 9/00798 |
| | | | | 382/190 |
| 2008/0027627 | A1* | 1/2008 | Ikeda | G06K 9/00798 |
| | | | | 701/117 |
| 2008/0240505 | A1* | 10/2008 | Nakamura | G01C 21/26 |
| | | | | 382/103 |
| 2008/0240573 | A1* | 10/2008 | Nakamura | G01C 21/26 |
| | | | | 382/190 |
| 2013/0057688 | A1* | 3/2013 | Furukawa | G08G 1/166 |
| | | | | 348/148 |
| 2013/0176436 | A1* | 7/2013 | Lin | B60W 50/14 |
| | | | | 348/148 |
| 2013/0250107 | A1* | 9/2013 | Okada | G06K 9/00805 |
| | | | | 348/148 |
| 2015/0025786 | A1* | 1/2015 | Hohm | B60W 40/105 |
| | | | | 701/300 |
| 2015/0035983 | A1* | 2/2015 | Niemz | G06K 9/00805 |
| | | | | 348/148 |
| 2015/0066351 | A1* | 3/2015 | Wang | G01C 21/30 |
| | | | | 701/400 |
| 2015/0308854 | A1* | 10/2015 | Tanaka | G01C 21/3697 |
| | | | | 701/439 |
| 2016/0098839 | A1* | 4/2016 | Stein | G01C 3/22 |
| | | | | 382/106 |
| 2016/0311374 | A1* | 10/2016 | May | H04N 5/2628 |
| 2016/0325682 | A1* | 11/2016 | Gupta | B60R 1/00 |
| 2016/0335510 | A1* | 11/2016 | Gupta | G06K 9/00805 |
| 2017/0082452 | A1* | 3/2017 | Sumizawa | B60W 30/10 |
| 2017/0113614 | A1* | 4/2017 | Fluegel | H04N 5/23229 |
| 2017/0132922 | A1* | 5/2017 | Gupta | G08G 1/0962 |
| 2017/0169301 | A1* | 6/2017 | Kunze | G06K 9/00825 |
| 2017/0248962 | A1* | 8/2017 | Hasberg | G05D 1/0246 |
| 2017/0262727 | A1* | 9/2017 | Kozuka | G06K 9/4604 |
| 2018/0041713 | A1* | 2/2018 | Gao | H04N 5/243 |
| 2018/0061105 | A1* | 3/2018 | Ito | G06T 7/70 |

FOREIGN PATENT DOCUMENTS

| | | |
|---|---|---|
| DE | 10311240 A1 | 9/2004 |
| DE | 102004003848 A1 | 8/2005 |
| DE | 102005015837 A1 | 10/2005 |
| DE | 102005039103 A1 | 3/2007 |
| DE | 102007017293 A1 | 10/2008 |
| EP | 1530186 A2 | 5/2005 |
| EP | 1653310 A2 | 5/2006 |

OTHER PUBLICATIONS

International Preliminary Report on Patentability for PCT/EP2010/051353 filed on Feb. 4, 2010, dated Aug. 9, 2011.

* cited by examiner

METHOD AND DEVICE FOR DETERMINING A VALID LANE MARKING

CROSS REFERENCE TO RELATED APPLICATIONS

This is a U.S. divisional patent application claiming the benefit of priority from U.S. 371 national phase patent application Ser. No. 13/146,569 filed on Oct. 4, 2011, which claims priority from Patent Cooperation Treaty patent application number PCT/EP10/051353 filed on Feb. 4, 2010, which claims the benefit of priority from German patent application number DE1020090007342.6 filed on Feb. 4, 2009, the entire contents of which are incorporated herein by reference.

STATEMENT REGARDING FEDERALLY SPONSORED RESEARCH OR DEVELOPMENT (Not Applicable)

THE NAMES OF THE PARTIES TO A JOINT RESEARCH AGREEMENT (Not Applicable)

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

(Not Applicable)

STATEMENT REGARDING PRIOR DISCLOSURES BY THE INVENTOR OR A JOINT INVENTOR (Not Applicable)

BACKGROUND OF THE INVENTION

The invention relates to a method and a device for determining a valid lane marking, in which at least a first lane marking and a second lane marking different from the first lane marking are detected and one of these detected markings is selected as the relevant lane marking.

BRIEF SUMMARY OF THE INVENTION

In the prior art, camera-based driver assistance systems are known which comprise one or more mono or stereo cameras for observation and analysis of an area in front of the vehicle in the direction of travel. For capturing pictures for use in driver assistance systems both black-and-white camera systems and color camera systems are known which capture pictures of a detection area in front of the vehicle in the direction of travel and generate image data corresponding to these pictures. The image data are processed by least one processing unit, the pictures being analyzed and in particular images of objects in the pictures being detected and the objects being classified. In this connection, the detection and the classification are usually restricted to those objects that are relevant for the respective driver assistance system. Besides object recognition, the processing unit in particular performs object tracking, traffic sign recognition of objects classified as traffic signs, lane recognition and/or recognition of vehicles driving ahead and/or of oncoming vehicles. For lane recognition, usually the lane is detected on which the vehicle itself currently moves. Neighboring lanes might be detected as well. In this connection, it is possible that for example a lane change assistant provides an information or a warning to the driver when, for example, the currently used lane is left without an activation of the direction indicator. For detection of the currently used lane, the respective driver assistance system uses the markings that are applied to the lane for lane marking. However, in particular in the case of several overlapping lane markings it is difficult to detect the currently valid lane marking and to then use it for the respective driver assistance system which provides a driver assistance function on the basis of the lane markings. Such overlapping lane markings for example occur in areas of roadworks where at least for some part of the lane a so-called temporary lane marking at roadworks is applied in addition to the original permanent lane marking for the duration of the road construction work.

In Germany, for example, the permanent lane marking is applied to the lane in the color white and the temporary lane marking is applied in the color yellow. Thus, in a roadworks area as well as in an entry area and an exit area of a roadworks area differing lane markings are applied which the human eye usually distinguishes via their difference in color. The colors of temporary and permanent lane markings vary from country to country. Methods for distinguishing between temporary and permanent markings that are exclusively based on color information are thus dependent on an information as to in which country the vehicle moves. Further, although the use of the temporary marking is standardized, these standards are not always observed so that, for example, also in Germany, a yellow marking may be the relevant marking on the left side and a white marking may be the relevant marking on the right side at roadworks. Thus, even when using color cameras, the problem may occur that in bad light conditions, in particular when it rains, the distinction between the lane markings on the basis of their color is not possible with sufficient certainty. Further, by means of black-and-white cameras the colors differences may only be detected by differences in brightness of the different colors in the picture. In this way, a distinction between valid and non-valid markings is not possible with sufficient certainty. But the use of black-and-white cameras for capturing pictures for use in driver assistance systems has the advantage that CMOS image sensors, as used in particular in black-and-white cameras, allow for a high image resolution and a high gray level resolution of, for example, 4096 gray levels. At present, such a gray level or brightness resolution cannot be achieved with comparable color sensors. Also the further processing of the image data is considerably reduced in the case of black-and-white images compared to the further processing of the image data of color images so that the use of black-and-white cameras in driver assistance systems is advantageous.

From the document EP 1 653 310 A2, a method for the directional control of a road-bound vehicle using a camera mounted at a defined position on the vehicle is known. With the aid of the camera, a permanent lane marking is detected. Here, marking patterns are detected after entering a danger zone or an area of roadworks, and a control signal for the transverse directional control of the vehicle is determined.

From the document DE 103 112 40 A1, a method and a device for the directional control of a vehicle is known, in which a distinction is made between temporary and permanent markings on the lane. Whenever temporary markings are detected, these are preferably used for the directional control of the vehicle.

From the document DE 10 2004 003 848 A1, a method for recognizing marked danger zones and/or roadworks in the area of lanes is known. These methods use spatial separation images of a detection area of a sensor for electromagnetic radiation, for example a laser scanner, mounted on a vehicle. In the spatial separation images, distinguishing features for a danger zone and/or roadworks are looked for.

It is the object of the invention to specify a method and a device for determining a valid lane marking with the aid of a camera system of a vehicle, in which the distinction between a permanent lane marking and a temporary lane marking is improved.

This object is solved by a method having the features of claim 1 and by a device having the features of the independent device claim. Advantageous developments of the invention are specified in the dependent claims.

What is achieved by an inventive method and an inventive device is that when selecting the valid lane markings from at least two different lane markings, the relative position of the vehicle driving ahead to the two detected lane markings is taken into account.

It is advantageous to determine the course of movement of the vehicle driving ahead relative to the detected lane markings and to determine which of the detected lane markings is the valid lane marking due to the course of movement of the vehicle. When deciding which of the detected lane markings is the valid lane marking, further decision criteria may be taken into account, such as the position of the own vehicle relative to the first lane marking and relative to the second lane marking, the steering angle of the own vehicle or the yaw angle of the own vehicle relative to the course of the lane and/or the speed of the own vehicle.

It is particularly advantageous to determine a course of movement of the vehicle driving ahead on the basis of at least two, preferably on the basis of least three pictures captured successively as a picture series. Based on the determined course of movement of the vehicle driving ahead and the courses of the at least two detected lane markings, then one of the lane markings can be selected as the valid lane marking.

Further it is advantageous, when each of the lane markings comprises a right marking line and a left marking line and that the positions of the vehicle driving ahead are determined relative to the marking lines. Preferably it is checked whether the course of movement of the vehicle driving ahead corresponds to the courses of the two marking lines with at least a preset probability. The degree of correspondence, i.e. the probability of correspondence may be determined by using a known pattern recognition method, i.e. a so-called pattern matching method. The marking lines may be broken lines or solid lines.

Further it is advantageous to select from the at least two lane markings the lane marking as the valid lane marking that has a lateral offset transverse to the traffic direction of the lane for the two determined positions, which lateral offset lies within a preset range for both positions. Preferably, the positions are determined on the basis of a reference position that is vertically under the vehicle longitudinal axis on the lane. The range may then, for example, be preset with 0.8 m to 1.5 m, preferably 0.8 m to 1.2 m. Alternatively, the lane marking to which the determined positions of the vehicle driving ahead have an approximately equal lateral distance or a smaller lateral distance at least for one determined position may be selected as the valid lane marking.

Further, it is advantageous to detect a crossing of at least one marking line of one of the detected lane markings and to take it into account in the determination of the valid lane markings. The crossing of a marking line of one of the two detected lane markings is an indication that this lane marking is not the relevant lane marking.

Preferably a black-and-white camera, in particular a mono black-and-white camera and a stereo black-and-white camera, are used for picture capturing. The black-and-white cameras suitable for use in motor vehicles are generally more cost-efficient compared to color cameras suitable for use in motor vehicles, and they generally have a higher resolution and a higher dynamic in the sensing of the brightness levels so that in particular with a low illumination of the detection area a better detection of images of objects is possible compared to equivalent color cameras.

For determining the valid lane marking, it is particularly advantageous to determine a first degree of correspondence between the course of the first determined lane marking and the course of movement of the vehicle driving ahead as well as a second degree of correspondence between the course of the determined second lane marking and the course of movement of the vehicle driving ahead. The lane marking that has a higher degree of correspondence will then be selected as valid lane marking. Here it is advantageous to select the lane marking with the highest degree of correspondence as the relevant lane marking only when it has a minimum degree of correspondence and/or when the difference between the first degree and the second degree exceeds a preset minimum difference.

It is particularly advantageous when a lane departure warning system is provided with the course of the lane marking determined as the valid lane marking or with an information on the lane marking selected as the valid lane marking. The driver assistance system then takes the course of the determined valid lane marking into account as the lane marking to be followed. The lane departure warning system can in particular be a lane change assistance system.

In addition, the position of the own vehicle relative to the first lane marking and relative to the second lane marking may be determined, preferably repeatedly. The determined position or the determined positions are taken into account in the selection of the relevant lane marking. In particular, the determined positions of the vehicle driving ahead and/or of the own vehicle, the determined courses of the detected lane markings and/or the steering movement or the yaw rate of the own vehicle may be fed to a classifier which then determines the relevant lane marking on the basis of these input variables.

It is particularly advantageous to determine the position of the own vehicle relative to the first lane marking and relative to the second lane marking several times, to determine the course of movement of the own vehicle on the basis of these determined positions and to take this course of movement into account in the selection of the valid lane markings, for example as an input variable for a classifier for determining the valid lane marking. The course of movement of the own vehicle can be determined with the aid of the steering angle and the speed of the own vehicle.

The device of the independent device claim can be developed in the same manner as the inventive method, in particular by the features specified in the dependent claims or by respective device features.

Further features and advantages of the invention result from the following description, which in connection with the attached Figures explains the invention in more detail with reference to embodiments.

DETAILED DESCRIPTION OF THE INVENTION

Figure 1:
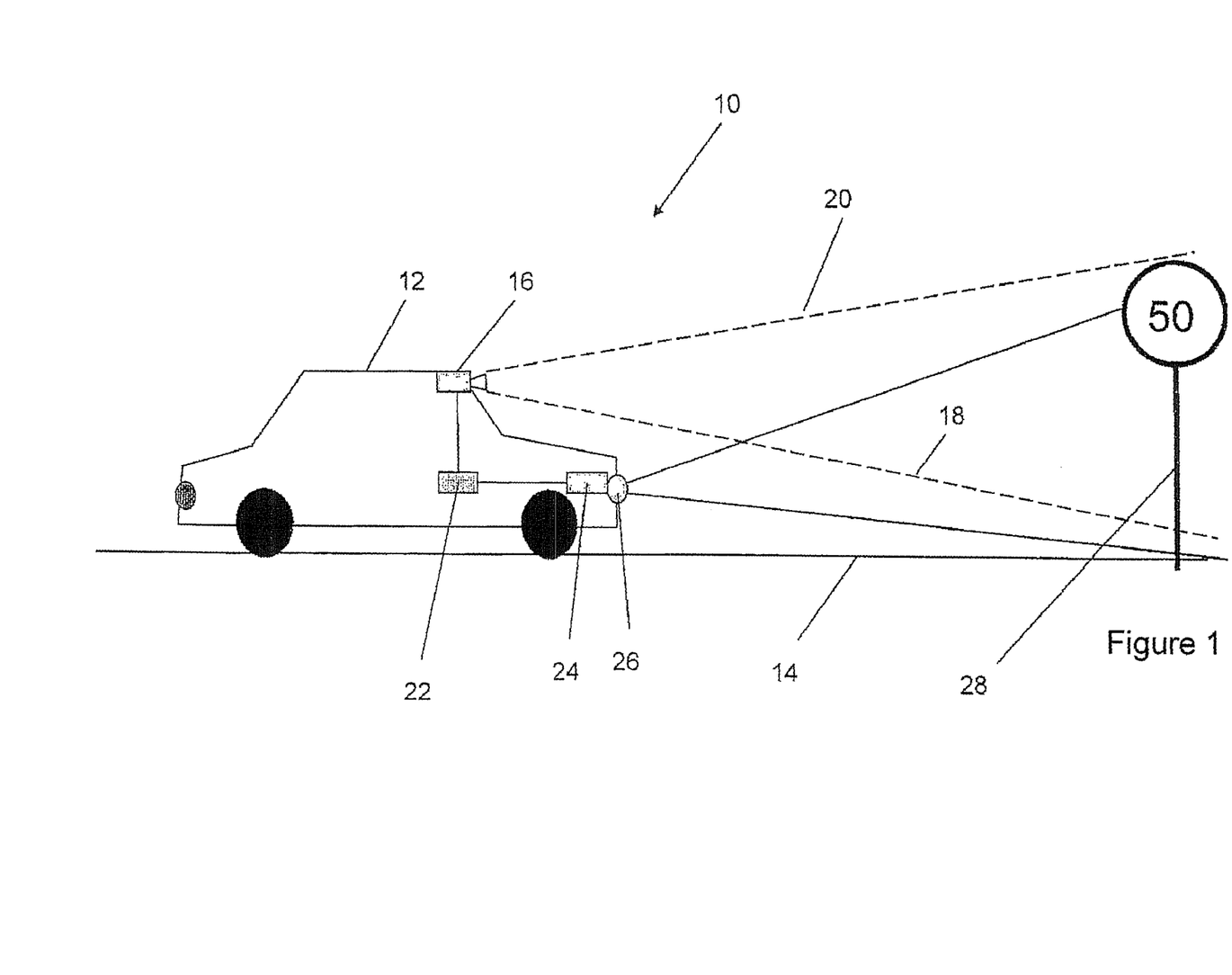
FIG. 1 shows a side view of a schematic illustration of a vehicle in a traffic situation, the vehicle having a device for capturing and processing pictures.

In FIG. 1, a side view of a vehicle 12 is shown in a traffic situation 10 during the travel of the vehicle 12 along a lane 14. The vehicle 12 has a camera system 16 with at least one camera 17. In the present embodiment, the camera system 16 is a mono camera system and a black-and-white camera system for capturing gray scale pictures. The camera system 16 captures a picture series of pictures with images of a detection area in front of the vehicle 12. The horizontal detection area is schematically illustrated in FIG. 1 by the broken lines 18, 20. Further, image data corresponding to the pictures are generated. The generated image data are transferred from the camera system 16 to a processing unit 22 arranged in the vehicle 12, which unit processes these data. In particular, the image data are processed in the processing unit 22 to provide a driver assistance system for the driver of the vehicle 12. The picture-taking rate of the camera 17 of the camera system 16 is preferably 10 to 50 pictures per second. The pictures are continuously taken by the camera at this rate and are continuously processed by the processing unit 22.

The image data of an object 28 generated by the camera system 16 are processed by the processing unit 22, the image of the object 28 being detected as an object image or as an object, and preferably the object type of the object 28 being classified. In the same manner, traffic signs, lane indicators, street lights, vehicles driving ahead on the lane 14 and oncoming vehicles on an oncoming lane may be detected as objects and their object type may be classified. In particular, the position of the images of the objects 28 detected in the picture is determined and compared to the position of the images of the same objects 28 in a following picture of the picture series. For simplification, the position of an image of an object in a picture is briefly referred to in the following as the position of the object in the picture or as the picture position of the object. The comparison of the position of objects 28 in a first picture and a second picture taken after this first picture is for example used to influence the driving behavior and/or to provide the driver of the vehicle 12 with defined information on the environment and on the own vehicle 12. This information can for example also serve as input data for driver assistance systems, in particular for a lane change assistance system.

Figure 2:
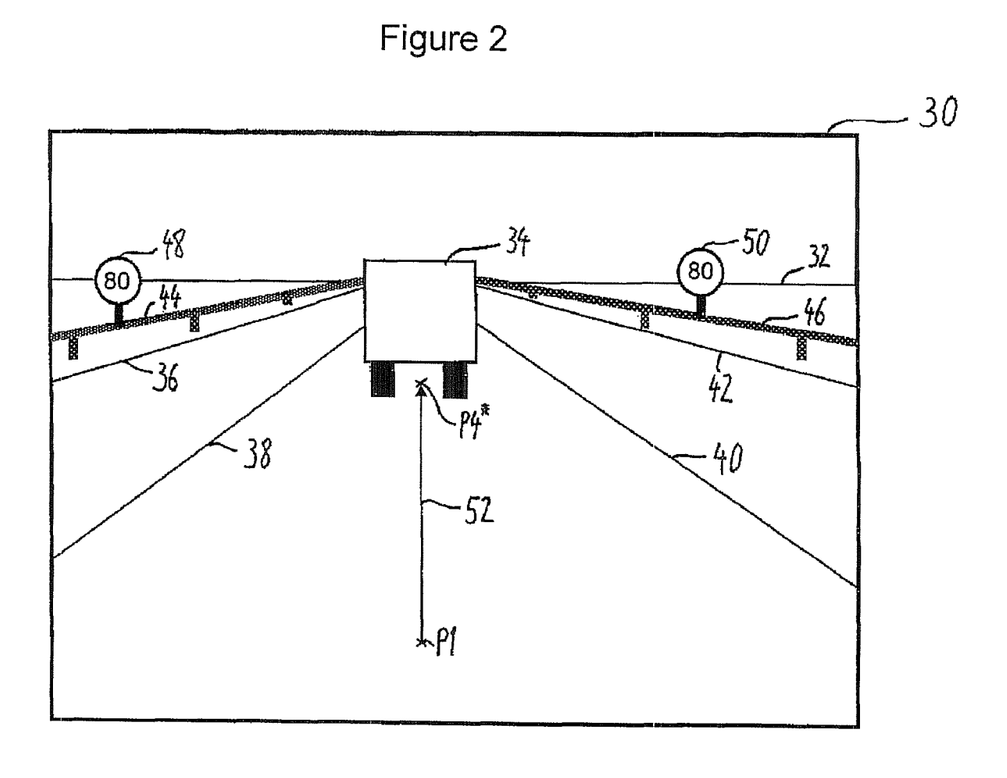
FIG. 2 shows the illustration of a first picture captured with the aid of the device, in which picture a vehicle driving ahead is imaged.

In FIG. 2, a first picture 30 of the detection area of the camera 17 in front of the vehicle 12 taken with the aid of the camera 17 is shown. In the picture 30, the horizon is illustrated as a solid line 32. Further, the picture comprises an image of a vehicle driving ahead 34, images of lane markings 36 to 42 and images of guard rails 44, 46 arranged laterally next to the outer lanes as well as traffic signs 48, 50 arranged laterally next to the lane. In FIG. 2, the lane markings 36 to 42 are merely schematically illustrated as solid lines. Actually, they may also be present in the form of broken lines and, for a better recognition, have a slightly larger width. In the picture 30, an arrow 52 is illustrated which indicates the direction of travel of the own vehicle as well as the direction of travel of the vehicle driving ahead. The starting point P1 of the arrow 52 is the position of the vehicle driving ahead 34 which has been determined in a preceding picture of a picture series taken of the detection area in front of the vehicle 12 with the aid of the camera 17. The end point P4 applies to the vehicle driving ahead 34 based on the position determined in the picture 30 shown in FIG. 2. Between the picture, based on which the position P1 has been determined, and the picture 30 a plurality of further pictures may have been taken with the aid of the camera 17. The image data of at least a part of these pictures have likewise been processed, or the position of the vehicle driving ahead 34 may have been determined repeatedly but not necessarily.

Figure 3:
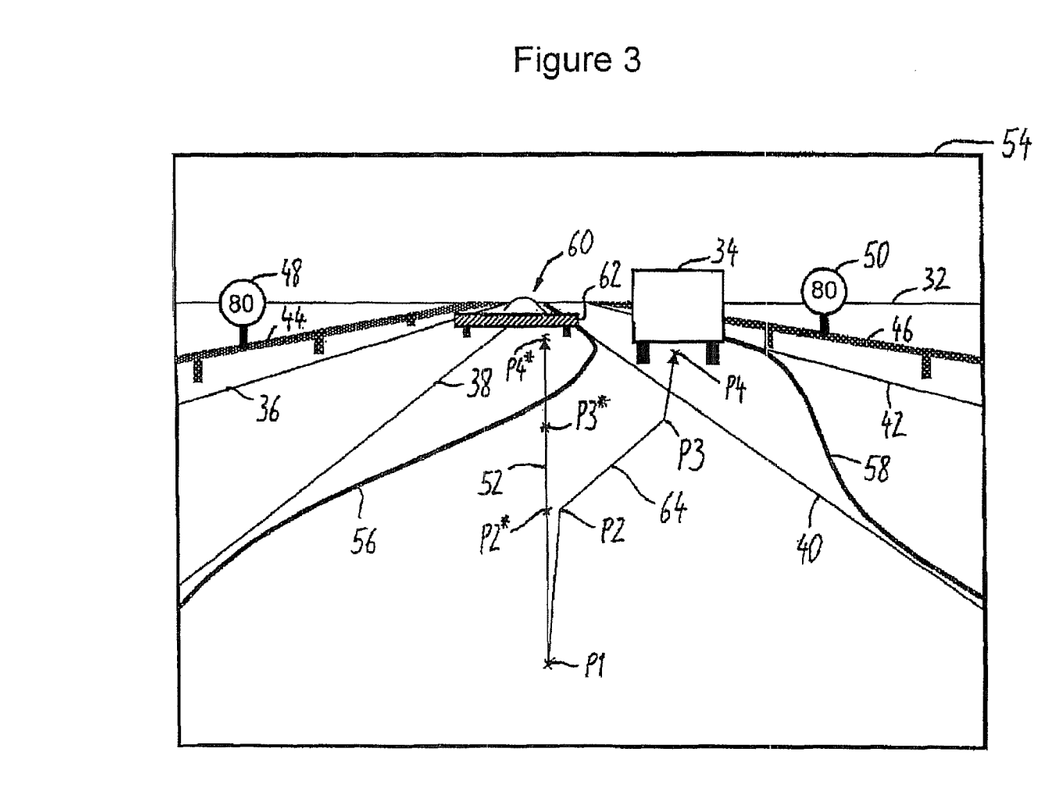
FIG. 3 is an illustration of a second picture captured with the aid of the device, in which picture the vehicle driving ahead and a permanent lane marking as well as a temporary lane marking are imaged.

In FIG. 3, a further picture 54 taken with the aid of the camera 17 is illustrated. In addition to the elements illustrated in the picture 30 according to FIG. 2, the picture 54 comprises images of temporary lane markings 56, 58. Further, images of roadworks 60 and of a road construction barrier 62 can be seen in the picture 54. The lane defined with the aid of the temporary lane markings 56, 58 deviates from the course of the lane delimited by the lane markings 38, 40 so that the traffic is diverted from this lane to the lane delimited by the markings 40, 42. For a simplified illustration, the pictures 30 and 54 only differ from one another by the additionally present lane markings 56, 58, the roadworks 60, 62 and the position of the vehicle driving ahead 34. For simplification of the following explanations, the arrow 52 is likewise illustrated in the picture 54 according to FIG. 3. In addition, an arrow 64 is illustrated which indicates several positions P1 to P4 of the vehicle driving ahead 34 and thus shows the course of movement of the vehicle 34. In a first picture taken before the picture 54, the position P1 of the vehicle driving ahead 34 has been determined. In a picture taken after this first picture, but taken before the picture 54, the position P2 of the vehicle driving ahead 34 has been determined. In a third picture taken before the picture 54, the position P3 of the vehicle driving ahead 34 has been determined. In picture 54, the position P4 of the vehicle driving ahead 34 has been determined. By connecting these determined positions, there results the arrow 64 which thus indicates the course of movement of the vehicle driving ahead 34 between the position P1 and the position P4. Between the shots of the first and the second picture, between the shots of the second and the third picture, and between the shots of the third picture and the picture 54, a large number of further pictures may have been taken and evaluated. The determined course of movement of the vehicle driving ahead 34 illustrated by the arrow 64 thus runs substantially parallel to the temporary lane markings 56, 58 and widely differs from the course of the lane markings 38, 40. The course of movement of the vehicle driving ahead 34 indicated by the arrow 64 intersects the original lane marking 40 between the position P3 and P4. As a result of the higher correspondence of the determined course of movement of the vehicle driving ahead 34 with the temporary lane markings 56, 58 compared to the permanent lane markings 38, 40, the lane markings 56, 58 are determined as valid lane markings 56, 58 and provided as relevant or valid lane markings 56, 58 for a driver assistance system. If, however, as positions for the vehicle driving ahead the positions P1, P2*, P3* and P4* had been determined in several successively taken pictures, a course of movement of the vehicle driving ahead 34 that is parallel to the lane markings 38, 40 is determined by means of these positions P1, P2*, P3*, P4*. This course of movement then intersects the lane marking 56. The course of movement marked by the arrow 52 would thus correspond to the course of the lane markings 38, 40 so that these lane markings 38, 40 could then be used as valid lane markings.

Other factors however may as well be used in the determination of the valid lane marking or in the verification of a determined valid lane marking. In particular, warning barriers 62 arranged transversely to the lane can be used for determining or verifying a determined valid lane marking. Also the position of the own vehicle 12, a steering angle of the vehicle 12 or a yaw angle of the vehicle 12 as well as the speed of the vehicle 12 can be taken into account in the determination or verification of the valid lane marking.

In general, the behavior of an existing vehicle driving ahead 34 is observed and is taken into account in the selection of the valid lane marking. Additionally or alternatively, the driving behavior of the own vehicle 12 can be taken into account in the determination of a valid lane marking.

It can be assumed that a vehicle 12, 34 drives approximately in the center of a valid lane, this being true both for the vehicle driving ahead 34 and the own vehicle 12. With the aid of the described approach, the valid lane marking can easily be determined in the case of overlapping lane markings. Such overlapping lane markings in particular occur in the case of temporary lane markings 56, 58 that are applied to the lane 14 in addition to already present lane markings 36 to 42. This may in particular be necessary when roadworks 60 require the closing off of at least one lane. When, by analyzing the course of movement 54, it is determined that the vehicle driving ahead 34 relatively abruptly changes its direction before it enters an area of roadworks 60, as this is shown in FIG. 3, then the driver assistance system may conclude a transfer to the lane with the lane markings 56, 58 on the basis of the abrupt change of the direction of travel of the vehicle driving ahead 34 by way of a comparison of the change in position of the vehicle driving ahead 34 in several successively taken pictures. The lane delimited by the lane markings 56, 58 is also referred to as construction zone lane.

Figure 4:
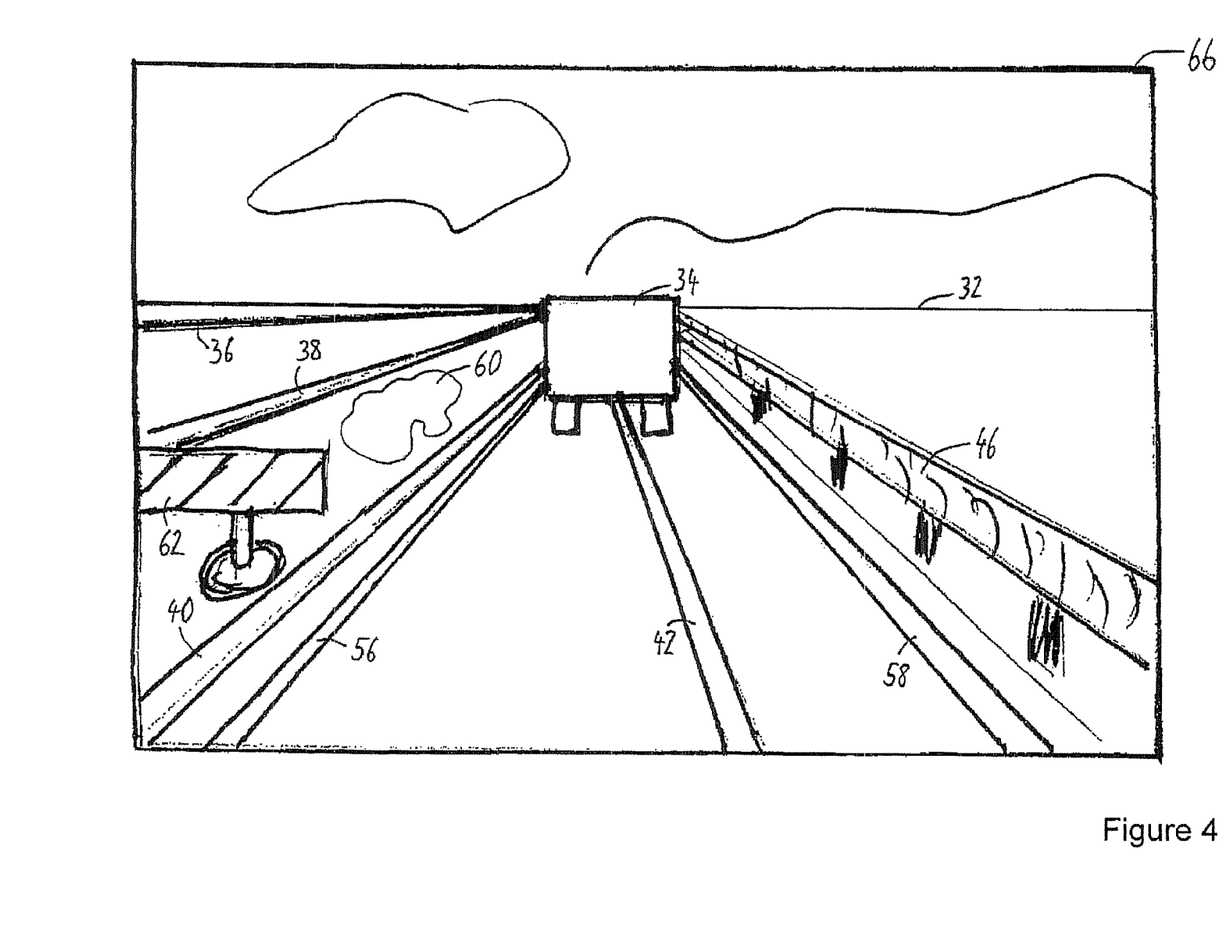
FIG. 4 is the illustration of a third picture captured with the aid of the device, in which picture the vehicle driving ahead and the permanent lane marking as well as the temporary lane marking are imaged.

In FIG. 4, a further picture 66 taken with the aid of the camera 17 is shown, in which the vehicle driving ahead 34 is located in front of the vehicle 12. By way of the lateral distance between the vehicle driving ahead 34 and the temporary lane markings 56, 58, these are still detected as relevant lane markings or as valid lane markings. The permanent lane marking 40 is still detected as non-valid lane marking.

In general, according to the invention an information for interpretation and for determination of the own lane is determined with the aid of a detected vehicle driving ahead 34, on the basis of which information a valid lane marking or valid lane is determined from several different lane markings or lanes. It is particularly advantageous to take the own movement of the vehicle 12 into account in the determination of the valid lane.

Figure 5:
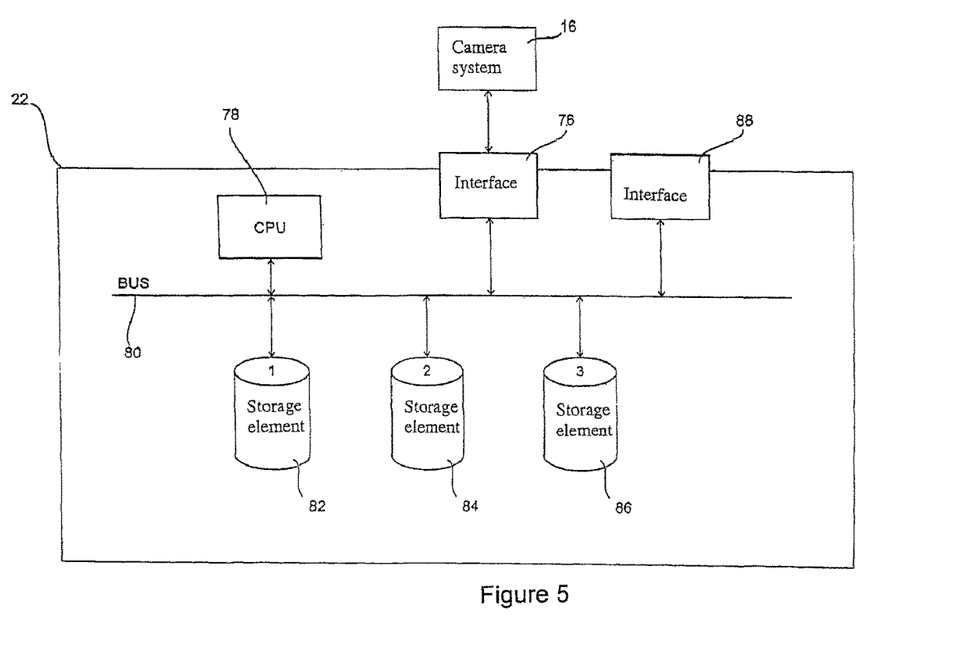
FIG. 5 is a block diagram with components of the device for capturing and processing pictures according to FIG. 1.

In FIG. 5, a block diagram with the processing unit 22 and the camera system 16 is shown, with the aid of which a valid lane marking is selected or the original selection of these lane markings 56, 58 as valid lane markings 56, 58 is confirmed. The processing unit 22 comprises a central processing unit (CPU) 78, a data bus 80 and three storage elements 82 to 86.

The processing unit 22 is connected to the camera system 16 via a first interface 76. Further, the processing unit 22 comprises a second interface 88, via which the data processed with the aid of the processing unit 22 can be output to other elements, for example the light control module 24. Preferably, the second interface 88 forms a connection to a vehicle bus system.

The CPU 78, the first interface 76, the second interface 88 and the storage elements 82, 84, 86 are connected to one another via the data bus 80. The image data corresponding to the pictures 44a to 44c, 52 generated with the aid of the camera system 16 are transmitted via the first interface 76 from the camera system 16 to the processing unit 22 as input data. The image data are stored in the first storage element 82. In the second storage element 84 of the processing unit 22 at least program data of at least one image processing program for determining the image positions P1 to P4, P1 to P4* are stored. Likewise, in the second storage element 84 program data of a routine for determining a valid lane and/or valid lane markings 56, 58 based on the determined image positions P1 to P4 and the course of detected lane markings 36 to 42, 56, 58 are stored.

The determined change in position of the vehicle driving ahead 34 between pictures successively taken with the aid of the camera 17 is then used as an input variable for a lane change assistance system and/or output via the second interface 88. Such a lane change assistance system is also referred to as a lane departure warning system.

The invention is described in connection with a mono camera for capturing gray level pictures. However, the invention may likewise be used in the same manner in a stereo camera system and/or in color cameras.

The invention claimed is:

1. A method for determining a lane with the aid of a camera system of a vehicle, in which:
    with the aid of a camera of the camera system, several pictures comprising images of an area in front of the vehicle are successively taken as a picture series, and image data corresponding to the respective pictures are generated;
    objects and/or object images are detected by processing the image data of at least a part of at least one of the pictures of the picture series, wherein the detected objects and/or objects include a warning barrier, a traffic sign, a guard rail, a guiding reflector post, a street light, a vehicle driving ahead and/or an oncoming vehicle; and
    the lane is determined dependent, at least in part, on a position of at least one detected object and/or object image relative to the lane.

2. A method for determining a lane with the aid of a camera system of a vehicle, in which:
    with the aid of a camera of the camera system, several pictures comprising images of an area in front of the vehicle are successively taken as a picture series, and image data corresponding to the respective picture are generated;
    the image data of at least a part of at least one of the pictures of the picture series are processed; and the position of a vehicle driving ahead is determined, at least in part, from the processed image data and is used by the lane change assistance system as an input variable in determining a valid lane marking.

3. The method according to claim 2 wherein the change in position of the vehicle driving ahead is used as an input variable for a lane change assistance system.

4. The method according to claim 2 wherein the change in position of the vehicle driving ahead is used by the lane change assistance system as an input variable in determining a valid lane marking.

5. A method for determining a lane with the aid of a camera system of a vehicle, in which:

with the aid of a camera of the camera system, several pictures comprising images of an area in front of the vehicle are successively taken as a picture series, and image data corresponding to the respective pictures are generated;

image data of at least a part of at least one of the pictures of the picture series are processed;

a comparison is made of the position of an object in a first picture to the position of the object in a second picture; and an environment of the vehicle is determined based on the comparison.

6. The method according to claim 5 wherein the environment of the vehicle is output to a driver assistance system.

7. The method according to claim 6 wherein the environment of the vehicle is output to a lane change assistance system.

8. A method for determining a lane with the aid of a camera system of a vehicle, in which:

with the aid of a camera of the camera system, several pictures comprising images of an area in front of the vehicle are successively taken as a picture series, and image data corresponding to the respective picture are generated;

a first position of the vehicle is determined by processing the image data of at least a part of at least one of the pictures of the picture series; and the first position of the vehicle is taken into account in determining a valid lane.

9. The method according to claim 8 wherein:

processing the image data includes determining a picture position of a reference image in at least one of the pictures of the picture series; and the first position of the vehicle is determined, at least in part, from the picture position of the reference image.

10. The method according to claim 8 wherein:

a second position of the vehicle is determined by processing the image data of a least a part of at least one of the pictures of the picture series; and a valid lane is determined dependent, at least in part, on the change from the first position to the second position of the vehicle.

11. The method according to claim 10 wherein the second position of the vehicle is determined, at least in part, from a picture position of the reference image in a second picture of the picture series.

12. The method according to claim 8 wherein:

a change in direction of the vehicle is determined, at least in part, based on the change from the first position to a second position of the vehicle; and a valid lane is determined, at least in part, by the change in direction of the vehicle.

* * * * *

UNITED STATES PATENT AND TRADEMARK OFFICE
CERTIFICATE OF CORRECTION

PATENT NO. : 10,183,666 B2
APPLICATION NO. : 15/454079
DATED : January 22, 2019
INVENTOR(S) : Robert Spangenberg Page 1 of 1

It is certified that error appears in the above-identified patent and that said Letters Patent is hereby corrected as shown below:

In the Claims

In Claim 1, Column 8, Line 52, please delete "and/or objects", and add -- and/or object images --

In Claim 2, Column 8, Line 64, please delete "picture", and add -- pictures --

In Claim 8, Column 10, Line 2, please delete "picture", and add -- pictures --

Signed and Sealed this
Fourteenth Day of May, 2019

Andrei Iancu
*Director of the United States Patent and Trademark Office*